(12) United States Patent
Siller

(10) Patent No.: US 12,271,158 B1
(45) Date of Patent: Apr. 8, 2025

(54) TOUCHLESS MACHINE CONTROLLER

(71) Applicant: Ronald Anthony Siller, New Braunfels, TX (US)

(72) Inventor: Ronald Anthony Siller, New Braunfels, TX (US)

( * ) Notice: Subject to any disclaimer, the term of this patent is extended or adjusted under 35 U.S.C. 154(b) by 0 days.

(21) Appl. No.: 17/327,661

(22) Filed: May 21, 2021

Related U.S. Application Data

(60) Provisional application No. 63/027,972, filed on May 21, 2020.

(51) Int. Cl.
*G05B 13/02* (2006.01)

(52) U.S. Cl.
CPC .............................. *G05B 13/0265* (2013.01)

(58) Field of Classification Search
CPC .................................................. G05B 13/0265
See application file for complete search history.

(56) References Cited

U.S. PATENT DOCUMENTS

| | | | | |
|---|---|---|---|---|
| 9,477,317 | B1* | 10/2016 | Clements | G06F 3/017 |
| 2006/0011419 | A1* | 1/2006 | Chuang | B66B 1/461 |
| | | | | 187/316 |
| 2014/0159802 | A1* | 6/2014 | Yu | H03K 17/945 |
| | | | | 327/517 |
| 2016/0034046 | A1* | 2/2016 | Waddell | G06F 3/0237 |
| | | | | 345/173 |
| 2020/0356210 | A1* | 11/2020 | Stone | G06F 3/0418 |

\* cited by examiner

*Primary Examiner* — Kamini S Shah
*Assistant Examiner* — Istiaque Ahmed
(74) *Attorney, Agent, or Firm* — Michael D. Eisenberg

(57) ABSTRACT

An example system may include a controller having a processor and memory, wherein the processor is configured to: receive output data from at least one sensor of the plurality of sensors; analyze the output data to determine an operation of the device corresponding to the output data; generate an operation output data based on the operation of the device; and provide the operation output data to the device to cause the device to execute the operation.

15 Claims, 11 Drawing Sheets

1050

Analyze the output fata received from more than one sensor; determine output data caused by an accidental activation of the sensors based on historic heuristics data stored in the memory; cancel the output data caused by the accidental activation; and
instruct the device to execute an operation corresponding to an intended output data
1052

Determine the output data caused by the accidental activation of the sensors based on data acquired from an AI module connected to the controller
1054

Determine output data received from an active sensor located furthest forward from a location of a user as an intended output data if a panel comprising a plurality of action indicator signs is positioned horizontally
1056

Determine output data received from an active sensor located furthest upward from a location of a user as an intended output data if a panel comprising a plurality of action indicator signs is positioned vertically
1058

Responsive to output data received from the multiple sensors activated within a current operation cycle and located at the same height or distance from a location of a user, determine the output data received from a sensor that was last activated within the operation cycles an intended output data
1059

Responsive to output data received from multiple sensors activated within a current operation cycle, select output data as an intended output data based on a configuration of the controller
1060

FIG. 10B

TOUCHLESS MACHINE CONTROLLER

CROSS-REFERENCES TO RELATED APPLICATIONS

This application claims priority from U.S. Provisional Application Ser. No. 63/027,972 filed May 21, 2021, which is hereby incorporated herein by reference in its entirety.

TECHNICAL FIELD

This application generally relates to a machine controller, and more particularly, to a multi-purpose touchless machine controller using motion detection.

BACKGROUND

Many devices include controllers that need to be touched by a user for the user to control the operation of the devices. Such devices include amusement machines (such as arcade crane/claw machines or arcade video game machines), other amusement machines, vending machines (dispensing for example, snacks, drinks, and/or consumer products), industrial machines (such as robots, machines for fabrication of goods or assembly, jetway/skybridge control)—anything that would typically use hands-on controls, such as but not limited to joysticks and buttons. Additionally, these devices may include mobility systems (e.g., powered wheelchairs, scooters), self-care systems, medical devices, and home control systems that would benefit the handicapped (physically impaired individuals).

FIG. 1 shows an example of a conventional controller 10 for controlling a device. The controller 10 includes a joystick 12 and an action button 14. The joystick 12 can be pushed or pulled by the user in a plurality of directions (generally left, right, up (away from the user) and down (toward the user). A sensor under the joystick determines the direction in which the joystick has been moved and instructs the device to perform an operation associated with the determined direction. The action button 14 may be pressed by the user. When the user presses the action button 14 a second sensor under the button senses the pushing of the button and instructs the device to perform an operation associated with the action button. The conventional controller depicted in FIG. 1 requires special equipment such as joystick and the button. Also, this controller requires the user to involve his hand or both which may be inconvenient. Using the conventional control systems, a user may touch possibly contaminated machine controls that can transmit dangerous pathogens to the human body and/or the controls may present any other type of contact-related risks such as electric shock, burns and the like.

Accordingly, a touchless controller for a machine or device using motion detection is desired.

SUMMARY

One example embodiment provides a processor and a memory, wherein the processor is configured to: receive output data from at least one sensor of the plurality of sensors; analyze the output data to determine an operation of the device corresponding to the output data; generate an operation output data based on the operation of the device; and provide the operation output data to the device to cause the device to execute the operation.

Another example embodiment provides a method that includes one or more of receiving output data from at least one sensor of the plurality of sensors; analyzing the output data to determine an operation of the device corresponding to the output data; generating an operation output data based on the operation of the device; and providing the operation output data to the device to cause the device to execute the operation.

BRIEF DESCRIPTION OF THE DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which:

FIG. 10B illustrates a further flow diagram 1050 of a method, according to some embodiments of the present invention.

DETAILED DESCRIPTION

Figure 1:
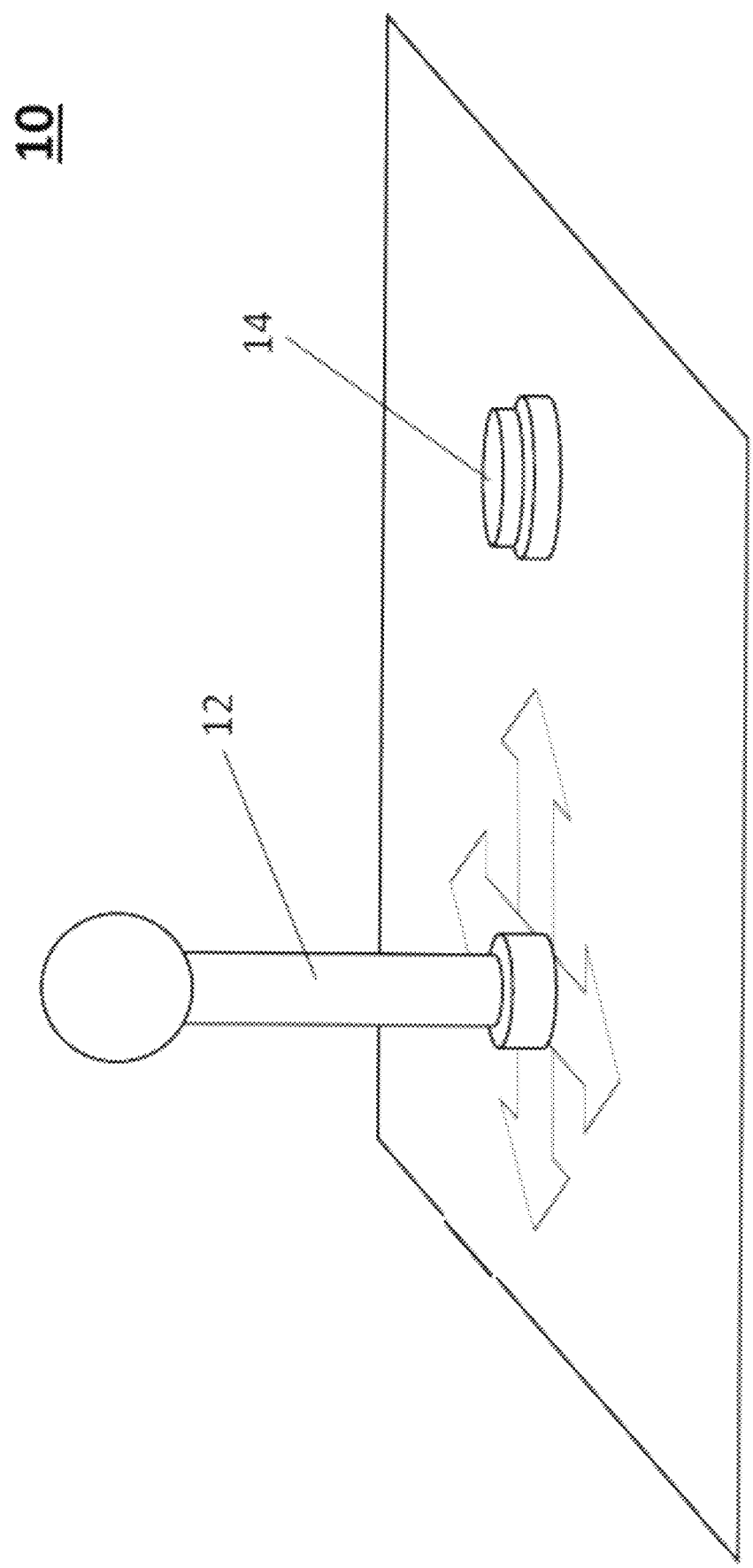
FIG. 1 is an illustration of the conventional controller that uses a joystick.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Accordingly, the example embodiments provide for a specific solution to a problem in the arts/field of machine controls. The example embodiments provide methods, systems, components, non-transitory computer readable media, devices, and/or networks, which provide for touchless control of a device or machine.

The exemplary embodiments address the need for a safe, effective and cost effective touchless means of controlling devices, which eliminates the necessity to touch possibly contaminated machine controls and mitigates the related risks associated with touching controls that can transmit dangerous pathogens to the human body and or that present any other type of contact-related risks such as electric shock, burns and the like. Additionally, the system and method, according to the exemplary embodiment, addresses the need for improved access to machines and systems by handicapped individuals, allowing such machines to be handicapped-accessible.

Conventional technology for touchless control relies on complex motion sensing technology. Motion sensors for touchless control are generally activated only when the user is far (e.g., 2-3 meters) from the sensors and are therefore impractical for controlling a device from a short distance. Moreover, the hardware of motion sensors is complex and expensive, and touchless control via motion sensors includes complex software to properly convert a user's motion to an input for the device. This makes known technology for touchless control too complex, impractical and expensive for devices that do not require complex inputs.

Figure 2:
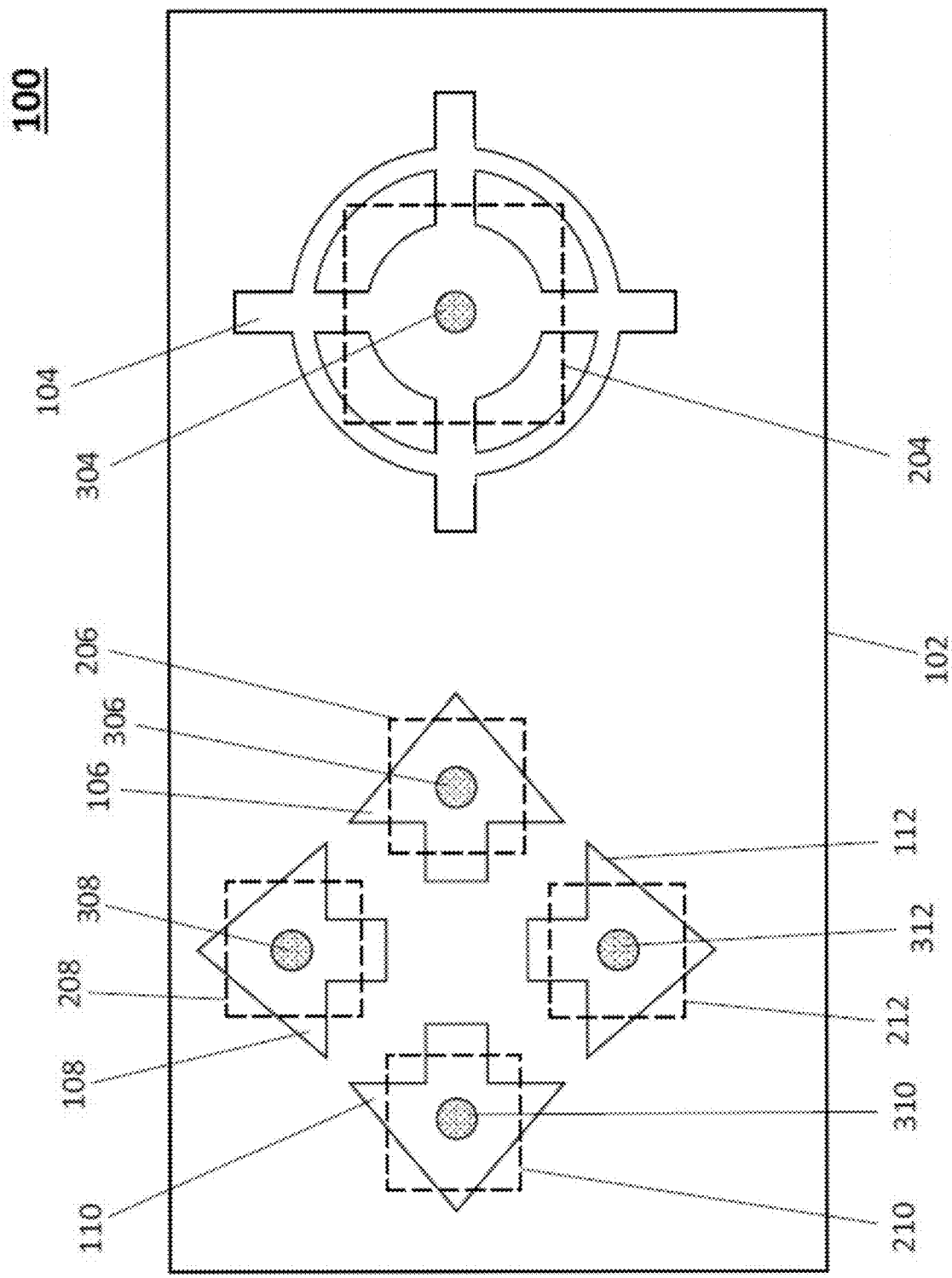
FIG. 2 illustrates a top view of a control panel 100 associated with the controller, according to some embodiments of the present invention.
Figure 3:
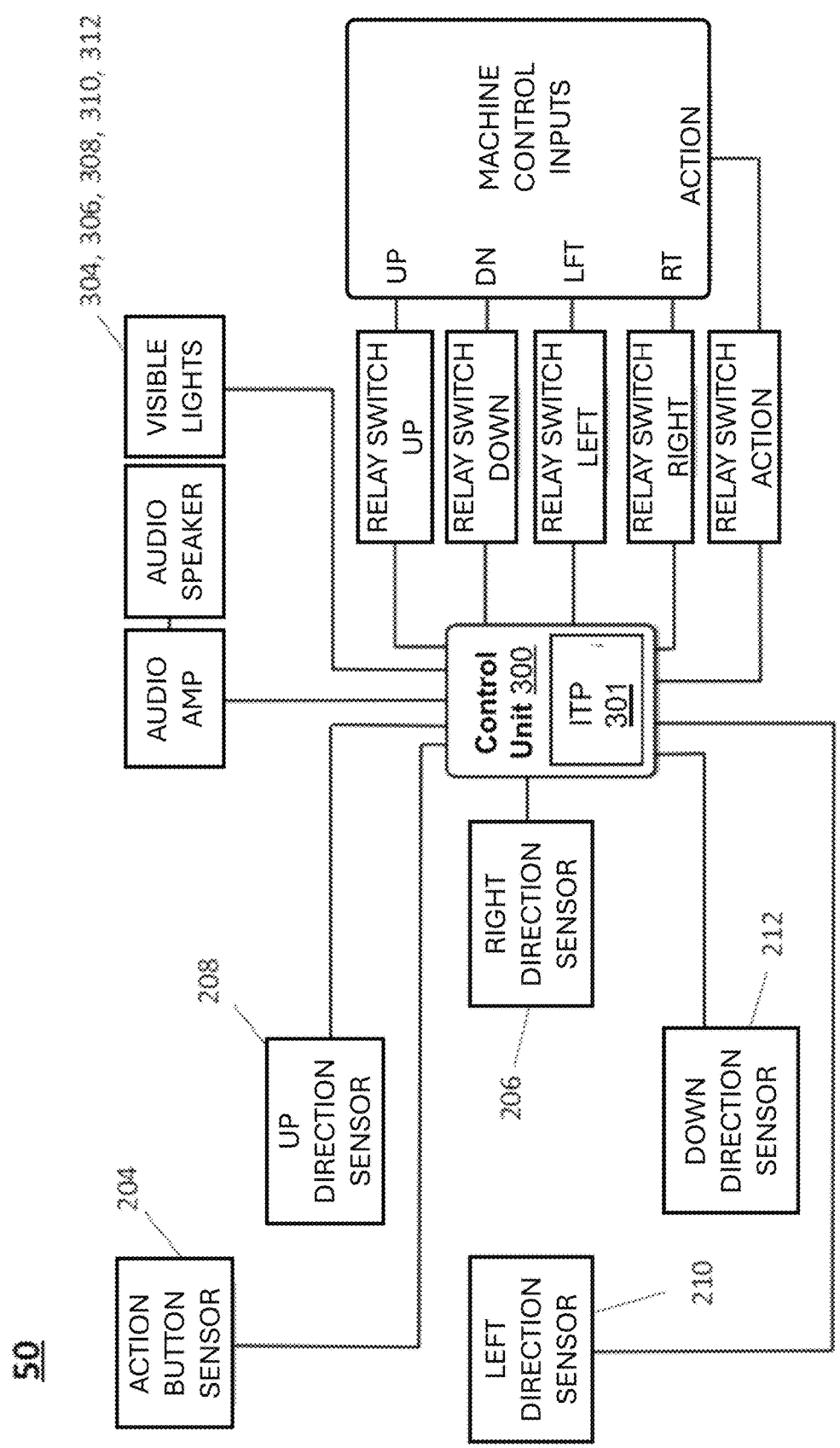
FIG. 3 is block diagram of the controller 50, according to some embodiments of the present invention.

FIG. 2 illustrates a top view of a control panel 100 associated with the controller, according to the exemplary embodiments. FIG. 3 is block diagram of a controller 50, according to the exemplary embodiments.

The controller 50 may include a plurality of discrete proximity sensors (204, 206, 208, 210, 212), and a control unit 300 having an Input Transforming Processor (ITP) 301. Each proximity sensor is associated with a respective operation of the device, as will be explained further below. Each proximity sensor is configured to detect a presence of an object (e.g., the user's hand or other body part) when the object is placed within a sensing range (i.e., predetermined distance and orientation of the proximity sensor) and for generating an output signal when the object is within the sensing range of the proximity sensor. Generally, the proximity sensors are disposed in a manner in which the sensing ranges of the proximity sensors do not overlap, but this is not a requirement. It is possible for the user's hand to be detected by more than one sensor at a time, even if the sensor areas themselves do not overlap. The exemplary embodiment implements a priority and timing based decision method in the input transforming processor (ITP) 301 to derive the correct result, despite coincidental sensor detections. The input transforming processor 301 of the control unit 300 is configured to receive the output signals generated by the proximity sensors in real-time and to analyze the output signals in order to determine the operation to be performed by the device controlled by the controller 50. The control unit 300 generates an operation output that is received by the device and causes the device to be perform the operation(s).

In the example depicted in of FIGS. 2 and 3, the device can perform the following five operations: move left, move up, move right, move down, and action. The proximity sensors 204, 206, 208, 210, 212 are located behind respective indicator signs 104, 106, 108, 110, 112 of the cover plate 102. The indicator sign 104 is an action indicator sign, which shows that the user must place the user hand or controlling appendage in front of the action indicator sign 104 to cause the device to perform a predetermined action-related operation (e.g., make a selection). The indicator sign 106 is a right-motion indicator sign, which shows that the user must place the user hand or controlling appendage in front of the right-motion indicator sign 106 to cause the device to perform a right-motion-related operation (e.g., move a real or virtual element of the device to the right). The indicator sign 108 is an up-motion indicator sign, which shows that the user must place his hand or controlling appendage in front of the up-motion indicator sign 108 to cause the device to perform an up-motion-related operation (e.g., move a real or virtual element of the device upward or away from the user). The indicator sign 110 is a left-motion indicator sign, which shows that the user must place the user hand or controlling appendage in front of the left-motion indicator sign 110 to cause the device to perform a left-motion-related operation (e.g., move a real or virtual element of the device to the left). The indicator sign 112 is a down-motion indicator sign, which shows that the user must place his hand or controlling appendage in front of the down-motion indicator sign 106 to cause the device to perform a down-motion-related operation (e.g., move a real or virtual element of the device downward or toward the user).

Thus, when the user places the hand or controlling appendage in front of a selected indicator sign (e.g., the up-motion indicator sign 108), the respective up-proximity sensor 208 detects the presence of the user's controlling appendage and generates an output signal which is received by the control unit 300. The control unit 300 generates an output value based on the currently active proximity sensors. This decoupling of the controllers output value from the raw input readings from the proximity sensors is critical to the exemplary embodiments. The controller 50 can implement application-specific methods for producing output control signals based on the inputs and recent history of the inputs stored in a local storage of the controller 50. If the control unit 300 receives an output signal from a single proximity sensor (e.g., the up-proximity sensor 208) in the cycle, the control unit 300 instructs the device to perform the operation associated with the up-motion. This may be performed by the control unit 300, for example, by closing a relay switch connected to the device's up-control input while keeping the relay switches connected to the other controls of the device open. The controller's output functions can be supplemented by opto-isolators (e.g., mechanical or electrical relays or simple transistors) required to provide isolated and durable interfacing to the target system replicating the functionality of electromechanical switches on conventional joysticks, buttons and the like.

If the control unit 300 receives output signals from two or more proximity sensors in the same cycle (e.g., the user's hand activates the up proximity sensor 208 while the user's forearm accidentally activates the right proximity sensor 206 or the down proximity sensor 212), the ITP 301 analyzes the outputs and cancels the outputs that were caused by the accidental activation of a sensor based on historic heuristics data. For example, this type of unintended signal might be triggered by a forearm and may occur while moving a hand (the controlling appendage) from the down proximity sensor 212 to the controller's up proximity sensor 208, causing the forearm to accidentally trigger the down proximity sensor 212. The up-sensor is usually positioned directly forward and in-line of the down-senor's location and vice versa.

Once the control unit 300 has canceled the output signal from the accidentally active proximity sensor(s), only correct output signal(s) remain. The control unit 300 therefore instructs the device to operate according to the correct output signal(s).

According to the exemplary embodiments, the control unit 300 identifies the output signals generated by accidentally-activated proximity sensors according to the following scheme:

If the panel 100 is in a horizontal configuration (such as a tabletop) and the sensors are all horizontally level with each other, the active input furthest forward from the location of the user is determined by the control unit 300 to be the intended input;

If the panel 100 is in vertical configuration (such as on a wall) and at least some of the sensors have different vertical heights, the active input furthest upward from the location of the user is determined by the control unit 300 to be the intended input.

Sensors that are located at the same height or distance and are active are evaluated by further rules, such as selection of the last input activated in order of activation. For example, when the left proximity sensor 210 and the right proximity sensor 206 are activated in the same cycle, but the left proximity sensor 210 was activated before the right proximity sensor 206, the control unit 300 identifies the intended input to be the input of the proximity sensor that was activated last in the cycle—i.e., the right proximity sensor 206. Thus, the control unit 300 instructs the device to perform the right-input related operation.

In some embodiments, the input transformation to be used by the control unit 300 can be pre-configured to prefer certain inputs over others as needed for special conditions, requirements and or greater accuracy. For example the 4-way directional inputs illustrated in the circuit diagram can be assigned higher priority than an action input. Then, anytime the higher priority 4-way directional inputs are active, the lower priority action button is deemed a lower priority and may not be considered.

To further improve operations of more complex systems operated by the example controller 50, an adaptive input recognition and transformation learning system, such as an AI system, may automatically train the control unit 300 to better predict/determine the user's intended inputs.

In the example depicted in FIG. 3, a first proximity sensor 204 is associated with an action-related operation to be performed by the device controlled by the controller 50, while the other proximity sensors 206, 2018, 210 and 212 are associated with movement-related operations of the device controlled by the controller 50. It should be noted that the controller 50 may have at least one proximity sensor associated with the action-related operation of the device and at least one proximity sensor associated with a motion-related operation of the device. Since different devices have a different number of action-related operations and a different number of motion-related operations available, the controller 50 of can be custom configured for different devices, by changing the number of proximity sensors or by activating/deactivating the proximity sensors.

The controller 50 may include connections to outputs triggering audible sound effects of audio systems that provide audio prompts as instantaneous feedback when a specific output control has been activated by the controller. This can be used to provide feedback to users who are completely blind or have vision impairment, or whenever the user needs to operate the controls without looking at them, for instance, to watch the system being controlled. Additionally, providing audible and/or visible feedback of the transformation processor's decisions helps the user learn how to use the controller 50.

Figure 4:
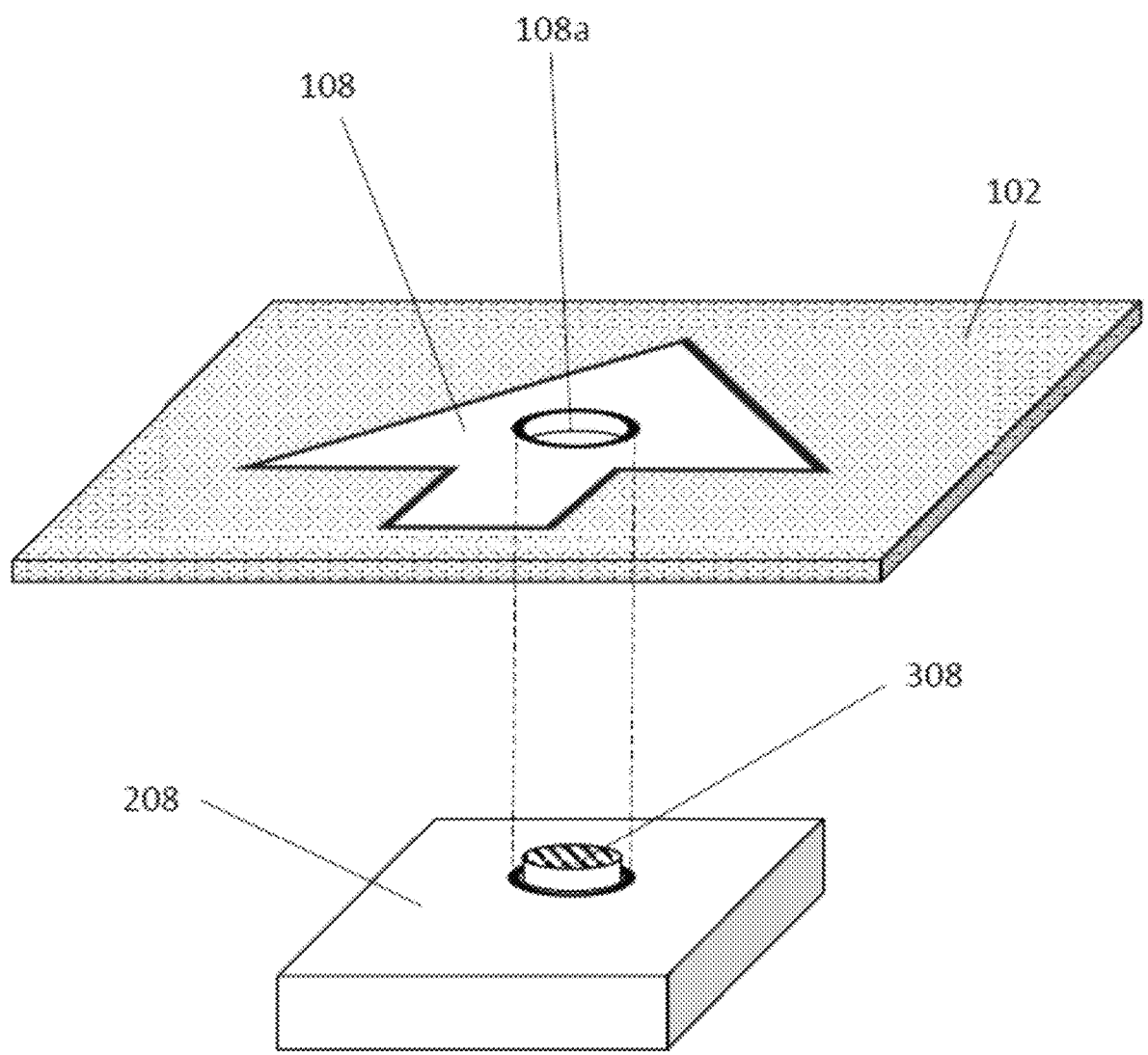
FIG. 4 illustrate position of an example proximity sensor relative to an indicator sign on a cover plate, in accordance with some embodiments of the present invention.
Figure 5:
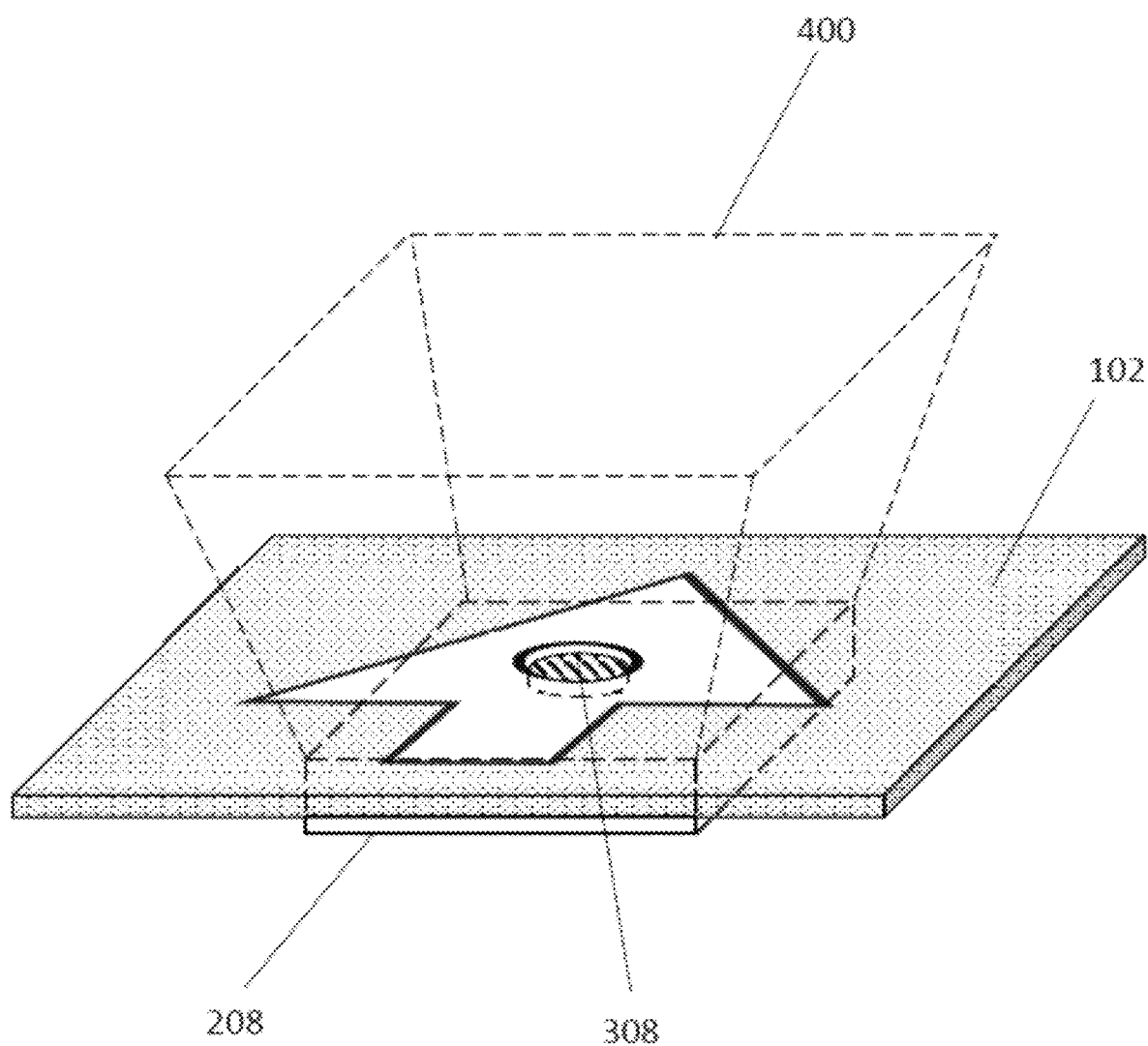
FIG. 5 illustrates a further example illustrate of positioning of the example proximity sensor relative to the indicator sign on the cover plate, in accordance with some embodiments of the present invention.

FIGS. 4 and 5 illustrate position of a proximity sensor 208 relative to an indicator sign 108 on the cover plate 102, according to some embodiments.

As discussed above, the proximity sensors may be covered by respective indicator signs. Thus, the up-sensor 208 is covered by the up-indicator sign 108. When the user places the controlling appendage in front of the up-indicator sign 108 within the sensing range 400 of the up-sensor 208, the up-sensor 208 becomes activated, causing the control unit 300 to instruct the device to perform the up-motion-related operation, as explained above.

In some embodiments, the controller 50 includes visible light emitters 304, 306, 308, 310, 312, associated with the sensors 204, 206, 208, 210, 212, respectively. Each visible light emitter is configured to be lit up when by the control unit 300 when the control unit 300 determines the desired input. Thus, if the desired input is an up-motion during a cycle, the visible light emitter 308 associated with the up-sensor 208 is lit up during the same cycle. In this manner, a visible feedback is given to the user to show the user what control the user has selected.

In some embodiments, each visible light is located above the respective proximity sensor. The cover plate 102 may include openings or transparent windows (e.g., 108a) located within the respective indicator sign (e.g., 108) located above the sensor (e.g., 208). In this manner, the light from each visible light emitter (e.g., 308) can be seen through the respective opening in or near the respective indicator sign. Thus, if the control unit 300 has determined within a cycle that the up-sensor 208 was correctly activated, then the control unit 300 lights up the visible light emitter 308 associated with the up sensor 208, and the visible light is seen through the opening or window 108a in the up-indicator sign 108. Thus, the user is given feedback showing that the user's gesture was interpreted as an instruction for the device to perform an up-motion-related operation.

In some embodiment, there are no openings or windows being used. Rather each indicator sign may be semi-transparent. In this manner, the actual indicator signs are lit when the respective visible light emitter is activated.

According to the exemplary embodiments, the proximity sensors may include infrared reflection sensors, pyroelectric infrared sensors, photoelectric sensors, ultrasonic sensors, radar sensors and the like.

The control unit 300 may include a microprocessor with memory. The relays may include PCB mount type relays with specs per application requirement. A double-sided PCB may be used for mounting all of the components with appropriate connector. Plastic enclosure may be used to protect the control panel made of ABS material. The cover plate 102 may be made with IR transmitting acrylic protective barrier configured to fit the top of the enclosure. The controller 50 may include an audio amplifier, a speaker, and visible light emitters that can be customized per customer requirements.

Figure 6:
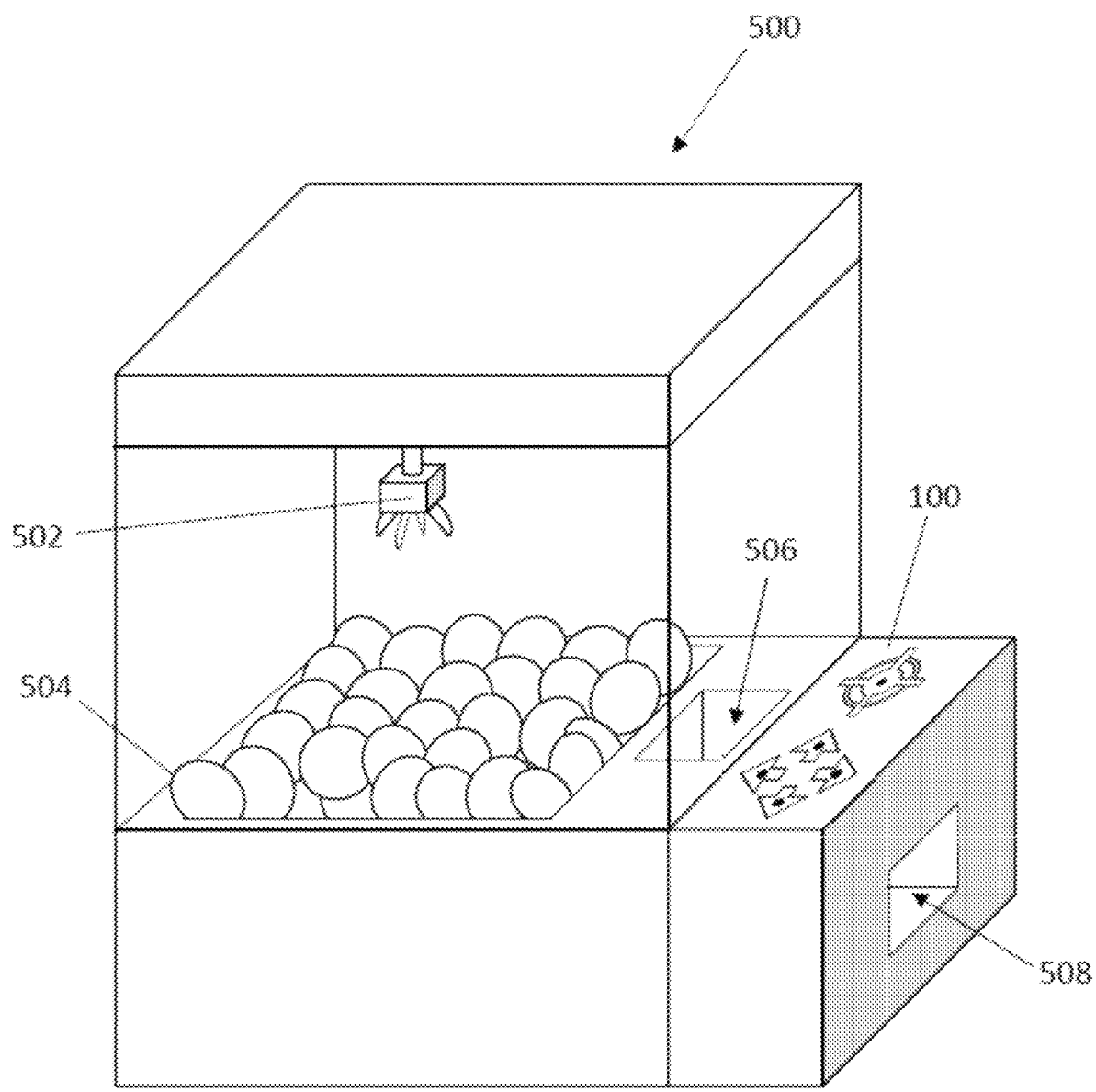
FIG. 6 illustrates an example of the control panel of the controller fitted on a claw machine, according to some embodiments of the present invention.

FIG. 6 illustrates an example of the control panel 100 of the controller 50 fitted on a claw machine 500. The claw machine includes a claw 502 that can be moved right, left, away from the user, and toward the user. When the controller activates the "right" output, the claw is moved to the right. When the controller activates the "left" output, the claw is moved to the left. When the controller activates the "up" output, the claw is moved away from the user. When the controller activates the "down" output, the claw is moved toward the user. When the controller activates the "action" output, the claw is brought down and closed in the vicinity of items 504, then moves on top of the opening 506 and is opened. If one of the items 504 was caught by the claw 502 when the claw 502 closes, the item falls into the opening 506 and can be retrieved by the user via the opening 508.

Figure 7:
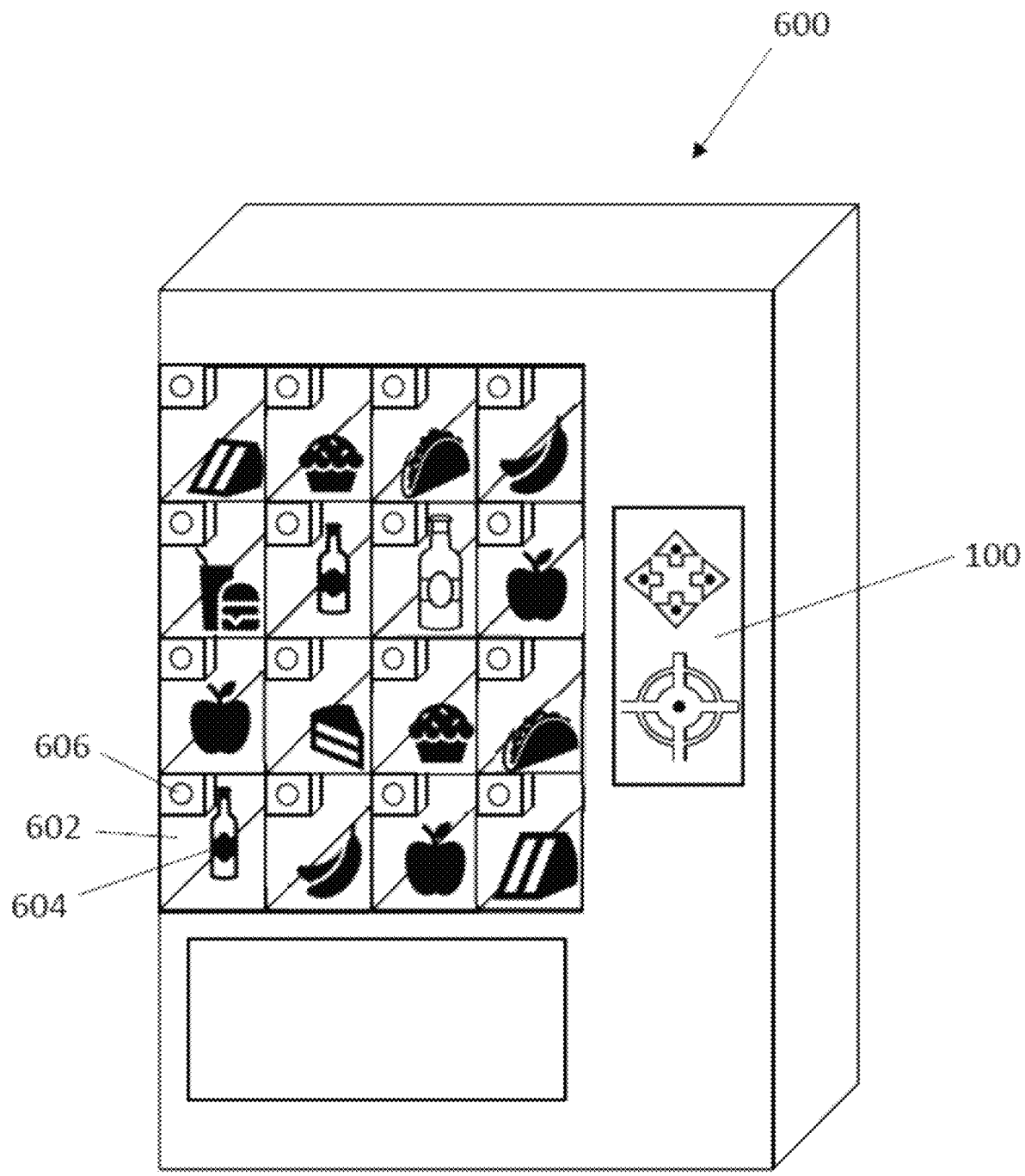
FIG. 7 illustrates another example of the control panel of the controller fitted on a vending machine, according to some embodiments of the present invention.

FIG. 7 illustrates another example of the control panel 100 of the controller 50 fitted on a vending machine 600, according to some embodiments of the present invention. The vending machine includes a plurality of cells 602. Each cell contains an item 604. Each cell is associated with a light 606. Initially, a predetermined light is on, showing that the associated cell is selected. When the controller activates the "right" output, the cell to the right of the previously selected cell is selected. The light of the previously selected cell turns off and the light of the currently selected cell is turned on, displaying the new selection. When the controller activates the "left" output, the cell to the left of the previously selected cell is selected. The light of the previously selected cell turns off and the light of the currently selected cell is turned on, displaying the new selection. When the controller activates the "up" output, the cell above the previously selected cell is selected. The light of the previously selected cell turns off and the light of the currently selected cell is turned on, displaying the new selection. When the controller activates the "down" output, the cell below of the previously selected cell is selected. The light of the previously selected cell turns off and the light of the currently selected cell is turned on, displaying the new selection. When the controller activates the "action" output, the item 604 in the currently selected cell is dispensed to the user.

Figure 8:
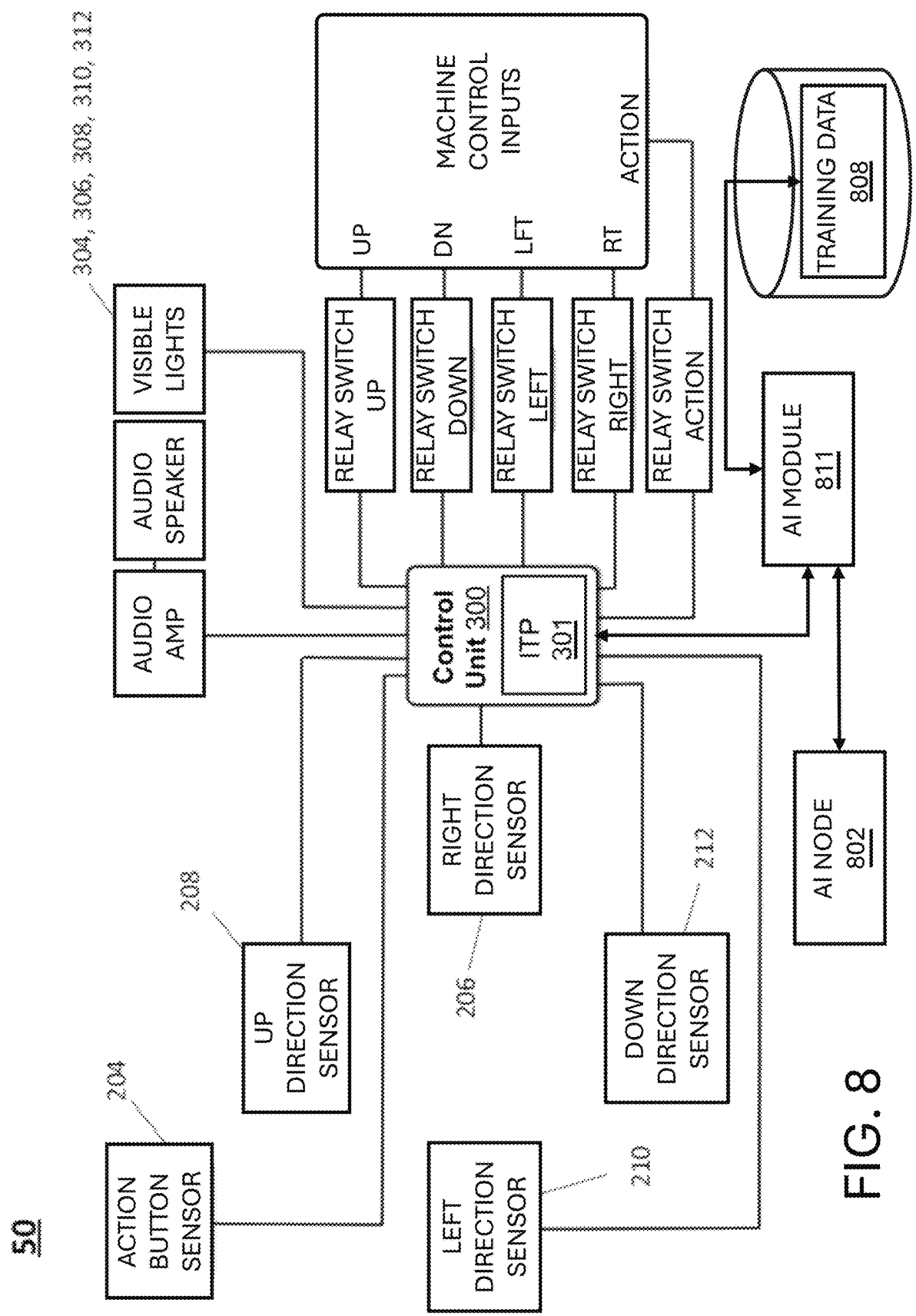
FIG. 8 illustrates the controller connected to an AI system for training input transforming processor of the control unit, in accordance with some embodiment of the present invention.

FIG. 8 illustrates the exemplary controller connected to an AI system for training ITP of the control unit, in accordance with an embodiment of the present invention.

Referring to FIG. 8, the example controller system 50 may include a machine learning AI node 802 connected to the ITP 301 over a network (wired or wireless). Machine learning relies on accumulated historical data (or training data) to build predictive models for accurate prediction on the ITP 301 outputs. Machine learning software may sift through millions of records to unearth non-intuitive patterns. In the example embodiment, the controller 50 may build and deploy a machine learning model for predictive monitoring and detection outputs of the ITP 301 connected to sensor data. A neural network may be used to improve both a training process of the machine learning model and a predictive process based on a trained machine learning models. For example, rather than requiring the ITP 301 to analyze inputs from multiple motion or action sensors, a neural network may be used to derive the outputs. This can significantly improve accuracy and speed of the ITP 301.

The ITP 301 may host or be connected to an AI module 811. The AI module 811 may be coupled to a data source for obtaining training data sets 808. As discussed above the data source may be a database or neural network or a combination thereof. The model may accurately address the readings of the sensors 204, 206, 208, 210 and 212.

The ITP may include a function to use an additional parameter for evaluating the priority of the left and right sensors. This parameter sets a delay after one of the two sensors is uncovered before a "covered" input from the other sensor is accepted. The purpose of this delay is to prevent a short "backward step" as the hand moves from one sensor to the other. The "backward step" may occur in the middle between the sensors where the hand can be seen by both sensors. The "backward step" may be caused by an unsteady detection as the hand moves from visible and not visible (or vice versa) for each sensor so the sensor might see the hand in one detection interval, not see it in the next detection interval, and see it again in a third detection interval. This can cause the ITP 301 to output one or more spurious direction changes (left or right). The delay may be selected (or tuned) so that false direction steps do not occur during a normal side to side swipe between the two sensors.

In one embodiment, a sensor sensitivity range (i.e., effective distance) may be adjusted to minimize unintended inputs triggered by other objects, lights or heat sources in the area. Further, the spacing between the controller's sensors may be adjusted based on the AI module 811 data to minimize unintended or unclear inputs from areas where the sensors' fields of view overlap. To further minimize unintended inputs the physical angle of the controller's panel surface may be adjusted so that the panel does not directly face the ceiling. This way the user's torso may block out nearby lights, heat sources and reflections while not itself causing unintended inputs.

The AI system node 802 may be a computing device or a server computer, or the like, and may include a processor, which may be a semiconductor-based microprocessor, a central processing unit (CPU), an application specific integrated circuit (ASIC), a field-programmable gate array (FPGA), and/or another hardware device. Although a single processor is intended to be used, it should be understood that the AI system node 802 may include multiple processors, multiple cores, or the like, without departing from the scope of the AI system node 802.

The AI system node 802 may also include a non-transitory computer readable medium that may have stored thereon machine-readable instructions executable by the processor to generate a training model(s). Examples of the non-transitory computer readable medium may include an electronic, magnetic, optical, or other physical storage device that contains or stores executable instructions. For example, the non-transitory computer readable medium may be a Random Access Memory (RAM), an Electrically Erasable Programmable Read-Only Memory (EEPROM), a hard disk, an optical disc, or other type of storage device.

Figure 9:
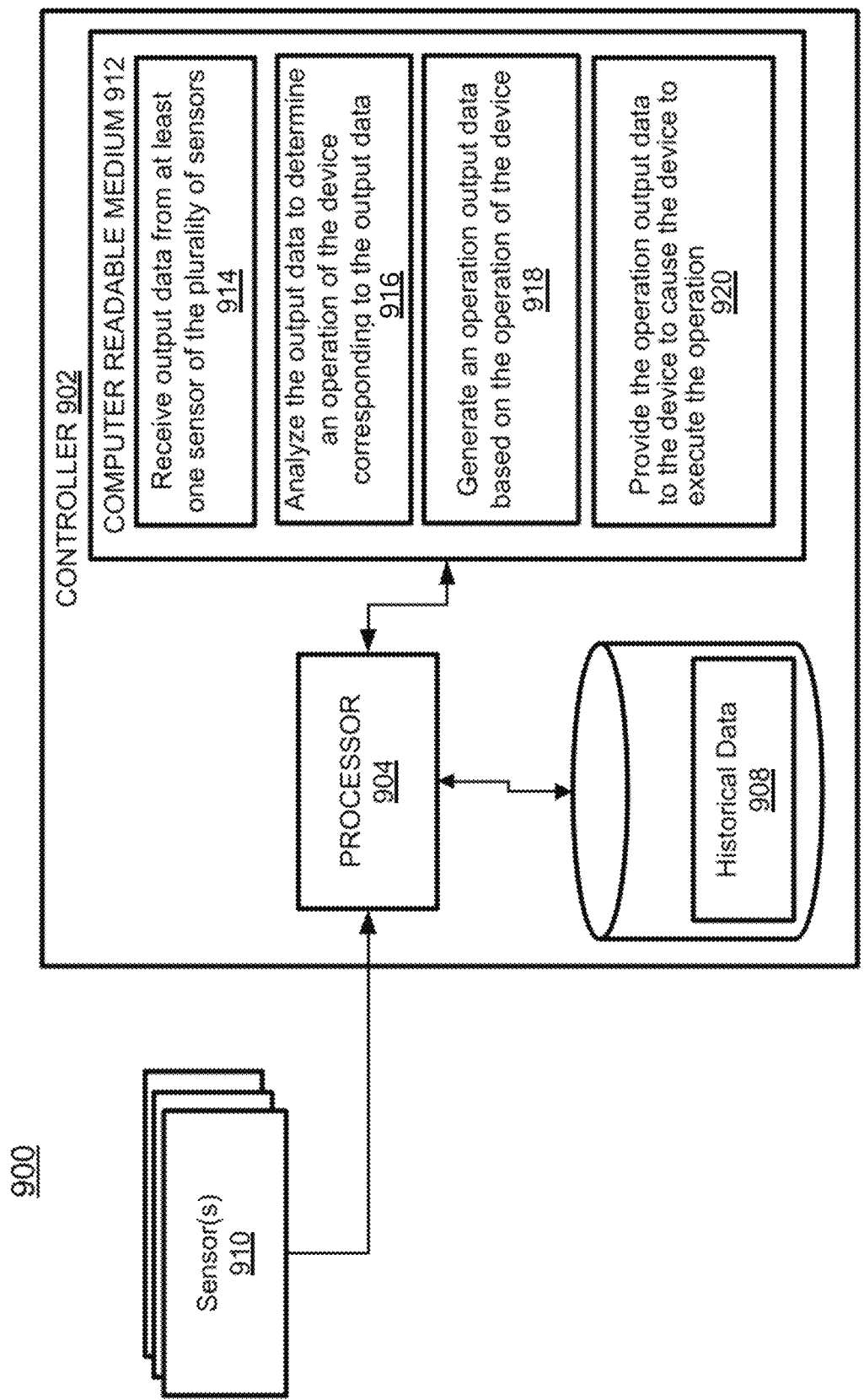
FIG. 9, illustrates diagram of a touchless controller system including detailed features of controller, according to some embodiments of the present invention.

FIG. 9, illustrates diagram 900 of a touchless controller system including detailed features of controller, according to example embodiments.

Referring to FIG. 9, the controller 902 may be operatively connected to a plurality of motion (or action) sensors 910. In one embodiment, the controller 902 may be wirelessly connected to the sensors 910 and to a machine being controlled (not shown). The controller may use some historical data 908 stored locally.

While this example describes in detail only one controller 902, multiple such units may be connected to the sensors 910. It should be understood that the controller 902 may include additional components and that some of the components described herein may be removed and/or modified without departing from a scope of the controller 902 disclosed herein. The controller 902 may be a computing device or a server computer, or the like, and may include a processor 904, which may be a semiconductor-based microprocessor, a central processing unit (CPU), an application specific integrated circuit (ASIC), a field-programmable gate array (FPGA), and/or another hardware device. Although a single processor 904 is depicted, it should be understood that the controller 902 may include multiple processors, multiple cores, or the like, without departing from the scope of the controller 902 system.

The controller 902 may also include a non-transitory computer readable medium 912 that may have stored thereon machine-readable instructions executable by the processor 904. Examples of the machine-readable instructions are shown as 914-920 and are further discussed below. Examples of the non-transitory computer readable medium 912 may include an electronic, magnetic, optical, or other physical storage device that contains or stores executable instructions. For example, the non-transitory computer readable medium 912 may be a Random Access memory (RAM), an Electrically Erasable Programmable Read-Only Memory (EEPROM), a hard disk, an optical disc, or other type of storage device.

The processor 904 may fetch, decode, and execute the machine-readable instructions 914 to receive output data from at least one sensor of the plurality of sensors 910. The processor 904 may fetch, decode, and execute the machine-readable instructions 916 to analyze the output data to determine an operation of the device corresponding to the output data. The processor 904 may fetch, decode, and execute the machine-readable instructions 918 to generate an operation output data based on the operation of the device. The processor 904 may fetch, decode, and execute the machine-readable instructions 920 to provide the operation output data to the device to cause the device to execute the operation.

Figure 10A:
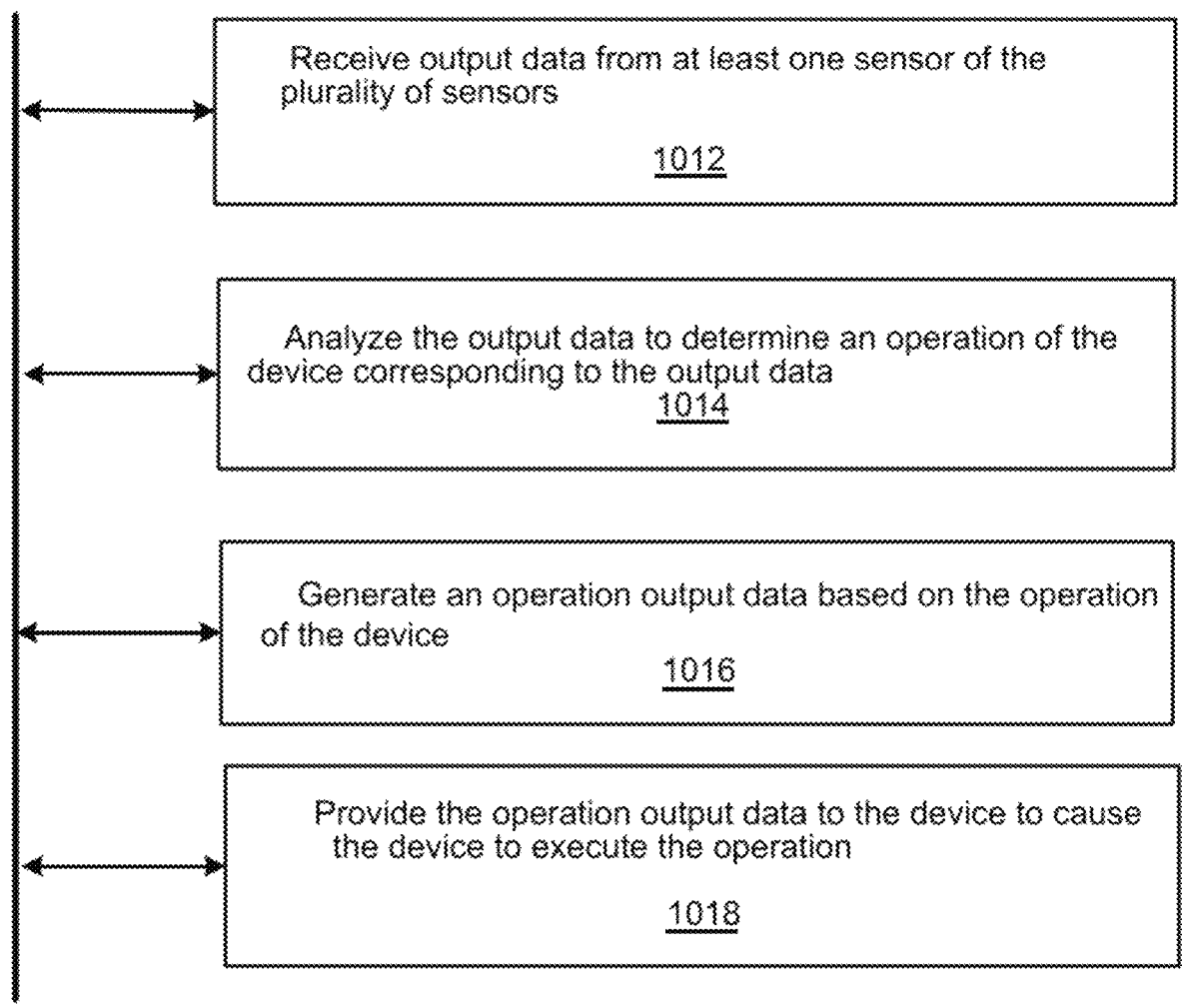
FIG. 10A illustrates a flow diagram 1000 of an example method for touchless control of a device, according to some embodiments of the present invention.

FIG. 10A illustrates a flow diagram 1000 of an example method for touchless control of a device, according to example embodiments. Referring to FIG. 10A, the method 1000 may include one or more of the steps described below.

FIG. 10A illustrates a flow chart of an example method executed by the controller 902 (see FIG. 9). It should be understood that method 1000 depicted in FIG. 10A may include additional operations and that some of the operations described therein may be removed and/or modified without departing from the scope of the method 1000. The description of the method 1000 is also made with reference to the features depicted in FIG. 9 for purposes of illustration. Particularly, the processor 904 of the controller 902 may execute some or all of the operations included in the method 1000.

With reference to FIG. 10A, at block 1012, the processor 904 may receive output data from at least one sensor of the plurality of sensors. At block 1014, the processor 904 may analyze the output data to determine an operation of the device corresponding to the output data. At block 1016, the processor 904 may generate an operation output data based on the operation of the device. At block 1018, the processor 904 may provide the operation output data to the device to cause the device to execute the operation.

FIG. 10B illustrates a further flow diagram 1050 of a method, according to example embodiments. Referring to FIG. 10B, the method 1050 may also include one or more of the following steps. At block 1052, the processor 904 may analyze the output data received from more than one sensor; determine output data caused by an accidental activation of the sensors based on historic heuristics data stored in the memory; cancel the output data caused by the accidental activation; and instruct the device to execute an operation corresponding to an intended output data. At block 1054, the processor 104 may determine the output data caused by the accidental activation of the sensors based on data acquired from an AI module connected to the controller. At block 1056, the processor 904 may determine output data received from an active sensor located furthest forward from a location of a user as an intended output data if a panel comprising a plurality of action indicator signs is positioned horizontally. At block 1058, the processor 904 may determine output data received from an active sensor located furthest upward from a location of a user as an intended output data if a panel comprising a plurality of action indicator signs is positioned vertically. At block 1059, the processor 904 may, responsive to output data received from multiple sensors activated within a current operation cycle and located at the same height or distance from a location of a user, determine the output data received from a sensor that was last activated within the operation cycle as an intended output data. At block 1060, the processor 904 may, responsive to output data received from multiple sensors activated within a current operation cycle, select output data as an intended output data based on a configuration of the controller.

According to the exemplary embodiments, the controller 50 has the following features:

Effective close proximity operation;
Responsive and accurate;
Minimal false or unintended inputs;
Effectively omits all or most unintended inputs;
Compact and similar in physical size to conventional controls;
Does not require a physical grip or actual grasp of any kind;
Can be operated by a handicapped person without a physical hand (an appendage such as a forearm is sufficient for the operation);
Simple easy retro fitting of machines and various systems electrical or otherwise that are normally equipped with conventional hands-on controls;
Can be mounted behind a protective barrier such as glass or plastics without loss in performance;
If needed, motion detection range can be easily adjustable;
Stable, consistent performance and operation;
Resistant to interference from ambient light, heat, radio, sound, vibration and the like;
Simple, intuitive ease of operation, minimal learning curve, operational movements are analogous to conventional controls but devoid of any contact;
Broad in application and can be easily applied to any industry (includes simple easy retrofitting of existing controls); and
Low cost and easy to manufacture.

Setup and operation of the system may be implemented as follows.

Initial Setup: After installation has been completed, sensor distance range (and other user settings) can be adjusted and stored to system memory optimizing operational performance and improving the user experience in general. For example, too short of a range may result in unintended physical contact with the machine's surface possibly resulting in undesired contamination, too long of a range may result in unintended input signals triggered by the user's own body and/or by other objects in the nearby environment.

Operation: When the user's hand is placed within range of a sensor on the touchless controller, the ITP 301 considers all active input data in real-time and, utilizing the proprietary scheme, determines which input is likely to be intended and omits any inputs that the ITP 301 perceives as unintended. Such unintended input signals can be accidentally triggered by one or more of the user's appendages, such as a wrist, forearm and the like. For example, this type of unintended signal will likely come from a forearm and will occur while moving a hand from the touchless controller's down-sensor to the controller's up-sensor, the up-sensor is usually positioned directly forward and in-line of the down sensor's location and vice versa.

After the active input signals have been evaluated and transformed by the ITP, a corresponding relay in the circuit executes a switch closure exactly mimicking a switch closure on a conventional hands-on controller thus completing the process and providing the desired control and operation of the machine. Upon each input activation, visual and/or audio feedback may be provided via means such as visible LED lights and/or an audible sound system per customer requirements.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, recipient or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

What is claimed is:

1. A controller, comprising:
a plurality of sensors configured, each sensor being configured to detect a presence of an object located within a sensing range of the sensor and to generate an output data responsive to the detection of the object;
a processor operatively connected to the plurality of sensors and to a device controlled by the controller;
a memory on which are stored machine readable instructions that when executed by the processor, cause the processor to:
receive output data from at least one sensor of the plurality of sensors;
analyze the output data to determine an operation of the device corresponding to the output data;
generate an operation output data based on the operation of the device; and
provide the operation output data to the device to cause the device to execute the operation;
wherein the instructions further cause the processor to:
analyze the output data received from more than one sensor during a detection cycle;
determine output data caused by an accidental activation of the sensors based on historic heuristics data stored in the memory;
cancel the output data caused by the accidental activation; and
instruct the device to execute an operation corresponding to an intended output data;
wherein:
the instructions further cause the processor to, responsive to output data received from multiple sensors activated within a current operation cycle, determine output data received from an active sensor located furthest forward from a location of a user as the intended output data, if the multiple sensors are positioned horizontally level with each other.

2. The controller of claim 1, wherein each sensor of the plurality of the sensors is a discrete proximity sensor associated with at least one operation of the device.

3. The controller of claim 1, wherein the sensors are disposed such that sensing ranges of the plurality of the sensors do not overlap.

4. The controller of claim 1, wherein the controller further comprising a plurality of action indicator signs, each covering a respective sensor of the plurality of the sensors, to indicate to user a device operation corresponding to a placement of a user appendage over an action indicator sign of the plurality of action indicator signs.

5. The controller of claim 1, wherein the instructions further cause the processor to determine the output data caused by the accidental activation of the sensors based on data acquired from an artificial intelligence (AI) module connected to the controller.

6. The controller of claim 1, wherein the instructions further cause the processor to, responsive to output data received from the multiple sensors activated within a current operation cycle, select output data as the intended output data based on a configuration of the controller.

7. A method for touchless controlling of a device, the method comprising:
detecting, by at least one sensor of a plurality of sensors, a presence of an object located within a sensing range of the at least one sensor and generating, by the at least one sensor, output data responsive to the detection of the object;
receiving, by a data transformation processor of a controller, the output data from the at least one sensor of the plurality of sensors;
analyzing, by the data transformation processor, the output data to determine an operation of the device corresponding to the output data;
generating, by the data transformation processor, an operation output data based on the operation of the device; and
providing the operation output data to the device to cause the device to execute the operation;
the method further comprising:
analyzing the output data received from more than one sensor during an operation cycle;
determining output data caused by an accidental activation of the sensors based on historic heuristics data stored in memory of the controller;
canceling the output data caused by the accidental activation; and
instructing the device to execute an operation corresponding to an intended output data;
the method further comprising, responsive to output data received from multiple sensors activated within a current operation cycle:
determining output data received from an active sensor located furthest forward from a location of a user as the intended output data, if the multiple sensors are positioned horizontally level with each other.

8. The method of claim 7, further comprising determining the output data caused by the accidental activation of the sensors based on data acquired from an artificial intelligence (AI) module connected to the controller.

9. The method of claim 7, further comprising, responsive to output data received from the multiple sensors activated within a current operation cycle, selecting output data as the intended output data based on a configuration of the controller.

10. A non-transitory computer readable medium comprising instructions, that when read by a processor, cause the processor to perform:
receive output data from at least one sensor of the plurality of sensors;
analyze the output data to determine an operation of the device corresponding to the output data;
generate an operation output data based on the operation of the device;
provide the operation output data to the device to cause the device to execute the operation;
analyze the output data received from more than one sensor during an operation cycle;
determine output data caused by an accidental activation of the sensors based on historic heuristics data stored in memory of the controller;
cancel the output data caused by the accidental activation;
instruct the device to execute an operation corresponding to an intended output data;
and
responsive to output data received from multiple sensors activated within a current operation cycle:
determine output data received from an active sensor located furthest forward from a location of a user as the intended output data, if the multiple sensors are positioned horizontally level with each other;

determine output data received from an active sensor located furthest upward from a location of a user as the intended output data, if multiple sensors are positioned vertically, at different vertical heights with respect to each other;

determine the output data received from a sensor that was last activated within the operation cycle as an intended output data, if the multiple users are located at the same height or distance from a location of a user.

11. The non-transitory computer readable medium of claim 10, further comprising instructions, that when read by the processor, cause the processor to perform determining the output data caused by the accidental activation of the sensors based on data acquired from an artificial intelligence (AI) module connected to the processor.

12. A controller, comprising:
a plurality of sensors configured, each sensor being configured to detect a presence of an object located within a sensing range of the sensor and to generate an output data responsive to the detection of the object;
a processor operatively connected to the plurality of sensors and to a device controlled by the controller;
a memory on which are stored machine readable instructions that when executed by the processor, cause the processor to:
receive output data from at least one sensor of the plurality of sensors;
analyze the output data to determine an operation of the device corresponding to the output data;
generate an operation output data based on the operation of the device; and
provide the operation output data to the device to cause the device to execute the operation;
wherein the instructions further cause the processor to:
analyze the output data received from more than one sensor during a detection cycle;
determine output data caused by an accidental activation of the sensors based on historic heuristics data stored in the memory;
cancel the output data caused by the accidental activation; and
instruct the device to execute an operation corresponding to an intended output data;
wherein:
the instructions further cause the processor to, responsive to output data received from multiple sensors activated within a current operation cycle, determine output data received from an active sensor located furthest upward from a location of a user as the intended output data, if the multiple sensors are positioned vertically, at different vertical heights with respect to each other.

13. A controller, comprising:
a plurality of sensors configured, each sensor being configured to detect a presence of an object located within a sensing range of the sensor and to generate an output data responsive to the detection of the object;
a processor operatively connected to the plurality of sensors and to a device controlled by the controller;
a memory on which are stored machine readable instructions that when executed by the processor, cause the processor to:
receive output data from at least one sensor of the plurality of sensors;
analyze the output data to determine an operation of the device corresponding to the output data;
generate an operation output data based on the operation of the device; and
provide the operation output data to the device to cause the device to execute the operation;
wherein the instructions further cause the processor to:
analyze the output data received from more than one sensor during a detection cycle;
determine output data caused by an accidental activation of the sensors based on historic heuristics data stored in the memory;
cancel the output data caused by the accidental activation; and
instruct the device to execute an operation corresponding to an intended output data;
wherein:
the instructions further cause the processor to, responsive to output data received from multiple sensors activated within a current operation cycle, determine output data received from a sensor that was last activated within the operation cycle as the intended output data, if the multiple sensors are located at the same height or distance from a location of a user.

14. A method for touchless controlling of a device, the method comprising:
detecting, by at least one sensor of a plurality of sensors, a presence of an object located within a sensing range of the at least one sensor and generating, by the at least one sensor, output data responsive to the detection of the object;
receiving, by a data transformation processor of a controller, the output data from the at least one sensor of the plurality of sensors;
analyzing, by the data transformation processor, the output data to determine an operation of the device corresponding to the output data;
generating, by the data transformation processor, an operation output data based on the operation of the device; and
providing the operation output data to the device to cause the device to execute the operation;
the method further comprising:
analyzing the output data received from more than one sensor during an operation cycle;
determining output data caused by an accidental activation of the sensors based on historic heuristics data stored in memory of the controller;
canceling the output data caused by the accidental activation; and
instructing the device to execute an operation corresponding to an intended output data;
the method further comprising, responsive to output data received from multiple sensors activated within a current operation cycle:
determining output data received from an active sensor located furthest upward from a location of a user as the intended output data, if multiple sensors arc positioned vertically, at different vertical heights with respect to each other.

15. A method for touchless controlling of a device, the method comprising:
detecting, by at least one sensor of a plurality of sensors, a presence of an object located within a sensing range of the at least one sensor and generating, by the at least one sensor, output data responsive to the detection of the object;
receiving, by a data transformation processor of a controller, the output data from the at least one sensor of the plurality of sensors;

analyzing, by the data transformation processor, the output data to determine an operation of the device corresponding to the output data;

generating, by the data transformation processor, an operation output data based on the operation of the device; and providing the operation output data to the device to cause the device to execute the operation;

the method further comprising:

analyzing the output data received from more than one sensor during an operation cycle;

determining output data caused by an accidental activation of the sensors based on historic heuristics data stored in memory of the controller;

canceling the output data caused by the accidental activation; and instructing the device to execute an operation corresponding to an intended output data;

the method further comprising, responsive to output data received from multiple sensors activated within a current operation cycle:

determining the output data received from a sensor that was last activated within the operation cycle as the intended output data, if the multiple users are located at the same height or distance from a location of a user.

* * * * *